(12) United States Patent
Smolinski et al.

(10) Patent No.: US 9,275,480 B2
(45) Date of Patent: Mar. 1, 2016

(54) ENCODING OF LINE PATTERN REPRESENTATION

(71) Applicant: Microsoft Corporation, Redmond, WA (US)

(72) Inventors: Adam Smolinski, North Bend, WA (US); Michael John Ebstyne, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 13/869,835

(22) Filed: Apr. 24, 2013

(65) Prior Publication Data

US 2014/0320503 A1    Oct. 30, 2014

(51) Int. Cl.
| | |
|---|---|
| G06T 9/00 | (2006.01) |
| G06T 11/20 | (2006.01) |
| G06K 9/48 | (2006.01) |
| G06K 9/62 | (2006.01) |

(52) U.S. Cl.
CPC . *G06T 11/20* (2013.01); *G06K 9/48* (2013.01); *G06K 9/6204* (2013.01); *G06T 9/00* (2013.01)

(58) Field of Classification Search
None
See application file for complete search history.

(56) References Cited

U.S. PATENT DOCUMENTS

| | | | |
|---|---|---|---|
| 4,542,526 A * | 9/1985 | Satoh | G06K 9/46 382/187 |
| 5,204,915 A | 4/1993 | Nishida | |
| 5,428,692 A | 6/1995 | Kuehl | |
| 5,640,607 A | 6/1997 | Murray | |
| 6,141,454 A * | 10/2000 | Seymour | G06T 9/20 382/108 |
| 6,628,279 B1 | 9/2003 | Schell et al. | |
| 7,137,076 B2 | 11/2006 | Iwema et al. | |
| 7,242,805 B1 * | 7/2007 | Reihani | G06K 9/00416 382/177 |
| 7,557,803 B2 * | 7/2009 | Furukawa | G06T 17/20 345/419 |
| 7,630,962 B2 | 12/2009 | Napper et al. | |
| 8,094,920 B2 | 1/2012 | Sugiyama et al. | |
| 8,179,604 B1 | 5/2012 | Prada Gomez et al. | |
| 8,514,178 B2 | 8/2013 | Song et al. | |
| 8,515,153 B2 | 8/2013 | Sugiyama et al. | |
| 9,189,825 B2 | 11/2015 | Im et al. | |

(Continued)

FOREIGN PATENT DOCUMENTS

EP    1229488 A2    8/2002

OTHER PUBLICATIONS

Walny, et al., "Understanding Pen and Touch Interaction for Data Exploration on Interactive Whiteboards", In IEEE Transactions on Visualization and Computer Graphics, Dec. 2012, 10 pages.

(Continued)

*Primary Examiner* — Bernard Krasnic
(74) *Attorney, Agent, or Firm* — Nicholas Chen; Fehmi Chebil; Micky Minhas

(57) ABSTRACT

The encoding of a line pattern representation. The line pattern representation has a changing value in a first dimension as a function of a value in a second dimension. The line pattern representation is segmented into multiple segments along the second dimension. The line pattern representation is then encoded by assigning a quantized value to each of the segments based on the changing value of the line pattern in the first dimension as present within the corresponding segment. If the line pattern generally falls within a given range within a segment, the segment will be assigned a quantized value corresponding to that range. The encoding may be used to assign the line pattern representation into a category.

20 Claims, 7 Drawing Sheets

(56) References Cited

U.S. PATENT DOCUMENTS

| | | |
|---|---|---|
| 2002/0075286 A1 | 6/2002 | Yonezawa et al. |
| 2002/0128796 A1* | 9/2002 | Matsutani .......... G06K 9/00154 702/155 |
| 2003/0185445 A1 | 10/2003 | Chang et al. |
| 2005/0271252 A1 | 12/2005 | Yamada |
| 2005/0275622 A1 | 12/2005 | Patel et al. |
| 2006/0007188 A1 | 1/2006 | Reiner |
| 2006/0010141 A1* | 1/2006 | Furukawa ............... G06T 17/20 |
| 2006/0013483 A1 | 1/2006 | Kurzweil et al. |
| 2007/0098289 A1 | 5/2007 | Kondo et al. |
| 2007/0173240 A1 | 7/2007 | Lim |
| 2008/0013793 A1 | 1/2008 | Hillis et al. |
| 2008/0091713 A1 | 4/2008 | Candelore et al. |
| 2008/0170776 A1 | 7/2008 | Albertson et al. |
| 2008/0304721 A1 | 12/2008 | Wu et al. |
| 2009/0324076 A1 | 12/2009 | Kolmykov-Zotov et al. |
| 2010/0104134 A1 | 4/2010 | Wang et al. |
| 2010/0278453 A1 | 11/2010 | King |
| 2010/0328201 A1 | 12/2010 | Marvit et al. |
| 2011/0252381 A1 | 10/2011 | Chaudhri |
| 2012/0069027 A1 | 3/2012 | Yamazaki et al. |
| 2012/0131520 A1 | 5/2012 | Tang et al. |
| 2012/0144335 A1 | 6/2012 | Abeln et al. |
| 2012/0197857 A1 | 8/2012 | Huang et al. |
| 2012/0229468 A1 | 9/2012 | Lee et al. |
| 2012/0256926 A1 | 10/2012 | Jimenez et al. |
| 2014/0325405 A1* | 10/2014 | Smolinski ............. G06T 11/203 715/764 |
| 2014/0325457 A1* | 10/2014 | Smolinski ............... G06F 3/017 715/863 |

OTHER PUBLICATIONS

Idreos, et al., "dbTouch: Analytics at your Fingertips", In Proceedings of 6th Biennial Conference on Innovative Data Systems Research, Jan. 6, 2013, 11 pages.

Holz, et al., "Relaxed Selection Techniques for Querying Time-Series Graphs", In Proceedings of the 22nd Annual ACM Symposium on User Interface Software and Technology, Oct. 4, 2009, 10 pages.

U.S. Appl. No. 13/869,771, filed Apr. 24, 2013, Smolinski et al.

U.S. Appl. No. 13/869,835, filed Apr. 24, 2013, Smolinski et al.

International Search Report & Written Opinion for PCT Patent Application No. PCT/US2014/034848, Mailed Date: Jul. 24, 2014, Filed Date: Apr. 22, 2014, 10 Pages.

Keogh, et al., "Relevance Feedback Retrieval of Time Series Data", In Proceedings of the 22nd Annual International ACM SIGIR Conference on Research and Development in Information Retrieval, Aug. 1, 1999, pp. 183-190.

Ryall, et al., "QueryLines: Approximate Query for Visual Browsing" In Proceedings of Extended Abstracts on Human Factors in Computing Systems, Apr. 2, 2005, pp. 1765-1768.

Wattenberg, Martin, "Sketching a Graph to Query a Time-Series Database", In Proceedings of Extended Abstracts on Human Factors in Computing Systems, Mar. 31, 2001, pp. 381-382.

Tirkaz, et al., "Sketched Symbol Recognition with Auto-Completion", In Journal Pattern Recognition, A Elsevier Science Inc. Publication, vol. 45, Issue 11, Apr. 25, 2012, pp. 3926-3937.

"International Search Report & Written Opinion for PCT Patent Application No. PCT/US2014/034850", Mailed Date: Jul. 18, 2014, Filed Date: Apr. 22, 2014, 12 Pages.

"Adobe Photoshop Help and Tutorials", Adobe, Feb. 1, 2013, pp. 226-228.

International Search Report & Written Opinion for PCT Patent Application No. PCT/US2014/034849, Mailed Date: Jul. 17, 2014, Filed Date: Apr. 22, 2014, 10 pages.

Utsumi, et al., "Direct Manipulation Interface using Multiple Cameras for Hand Gesture Recognition", Multimedia Computing and Systems, IEEE Conference Proceedings (Jun. 1998), pp. 264-267.

U.S. Appl. No. 13/869,771, Jun. 18, 2015, Office Action.

Office Action dated Sep. 23, 2015 cited in U.S. Appl. No. 13/869,816.

Notice of Allowance dated Dec. 10, 2015 cited in U.S. Appl. No. 13/869,771.

Office Action dated Nov. 30, 2015 cited in U.S. Appl. No. 13/869,816.

* cited by examiner

ENCODING OF LINE PATTERN REPRESENTATION

BACKGROUND

The information age is characterized by the widespread availability of information made possible through network communication. However, the mass of available information often makes it difficult to extract data of interest. Because of the potentially laborious nature of extracting valuable data from large amounts of less valuable information, the labor is often referred to as "data mining". Less valuable or irrelevant information is analogous to raw earth that must be sifted through in order to find valuable minerals, which are analogous to relevant information.

One way to extract information is to submit queries on databases. This method lends itself well to data that has identified properties that are monitored by the database. However, there is a wide variety of ways in which data can be stored. Some types of data, such as time series charts, are not quite as easy to sift through as they can often represent complex line representations that do not lend themselves well subject to database queries.

BRIEF SUMMARY

At least some embodiments described herein relate to the encoding of a line pattern representation. The encoding may be helpful when, for example, categorizing the line pattern representation. The line pattern representation has a changing value in a first dimension as a function of a value in a second dimension. The line pattern representation is segmented into multiple segments along the second dimension. The line pattern representation is then encoded by assigning a quantized value to each of the segments based on the changing value of the line pattern in the first dimension as present within the corresponding segment. For instance, the line pattern representation may also be divided into multiple ranges along the first dimension. If the line pattern generally falls within a given range (e.g., if the mean of the line pattern is within the given range) within a segment, the segment will be assigned a quantized value corresponding to that given range.

At least some embodiments described herein use the encoding to assign the line pattern representation into a category. For instance, perhaps those line pattern representations that have the same encoded representation are assigned to the same category. If there are too many categories, the number of segments in the second dimension and/or the number of ranges in the first dimension may be reduced. If there are too few categories, the number of segments in the second dimension and/or the number of ranges in the first dimension may be reduced.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
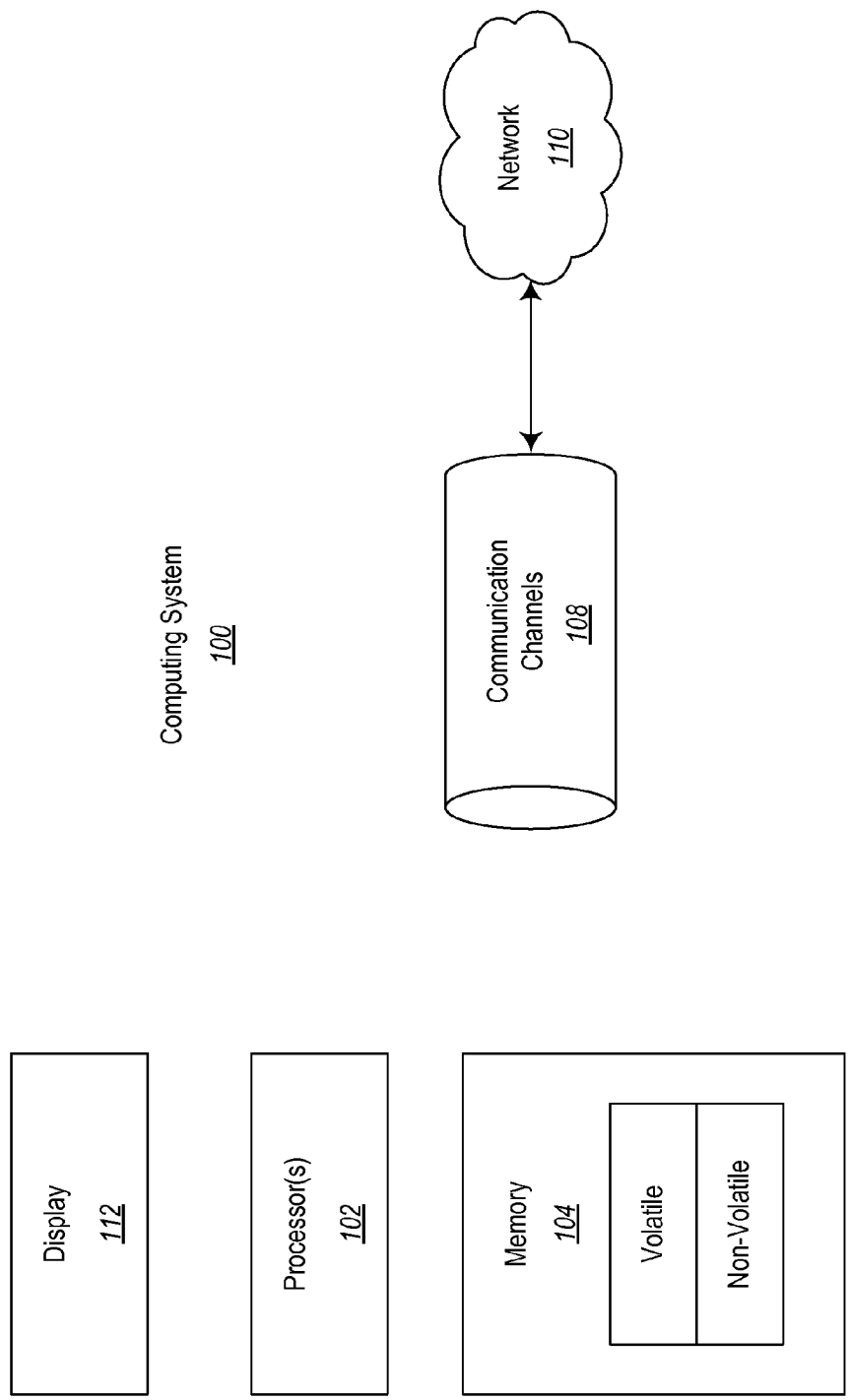
FIG. 1 abstractly illustrates a computing system in which some embodiments described herein may be employed.

At least some embodiments described herein relate to the encoding of a line pattern representation. The encoding may be helpful when, for example, categorizing the line pattern representation. The line pattern representation has a changing value in a first dimension (e.g., along the vertical or "y" axis) as a function of a value in a second dimension (e.g., along the horizontal or "x" axis). The line pattern representation is segmented into multiple segments along the second dimension. The line pattern representation is then encoded by assigning a quantized value to each of the segments based on the changing value of the line pattern in the first dimension as present within the corresponding segment. For instance, the line pattern representation may also be divided into multiple ranges along the first dimension. If the line pattern generally falls within a given range (e.g., if the mean of the line pattern is within the given range) within a segment, the segment will be assigned a quantized value corresponding to that given range.

At least some embodiments described herein use the encoding to assign the line pattern representation into a category. For instance, perhaps those line pattern representations that have the same encoded representation are assigned to the same category. If there are too many categories, the number of segments in the second dimension and/or the number of ranges in the first dimension may be reduced. If there are too few categories, the number of segments in the second dimension and/or the number of ranges in the first dimension may be reduced.

This mechanism for encoding and categorizing line patterns may be quickly performed and thus allows a computing system to quickly operate to categorize or re-categorize large volumes of line representations. While the categorization may not be exact, the categorization is fast and will likely be accurate enough to be able to derive intuitive information from the categorization. Thus, valuable information may be mined from a large number of line pattern representations. Some introductory discussion of a computing system will be described with respect to FIG. 1. Then, the encoding and categorization of the line pattern representations will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
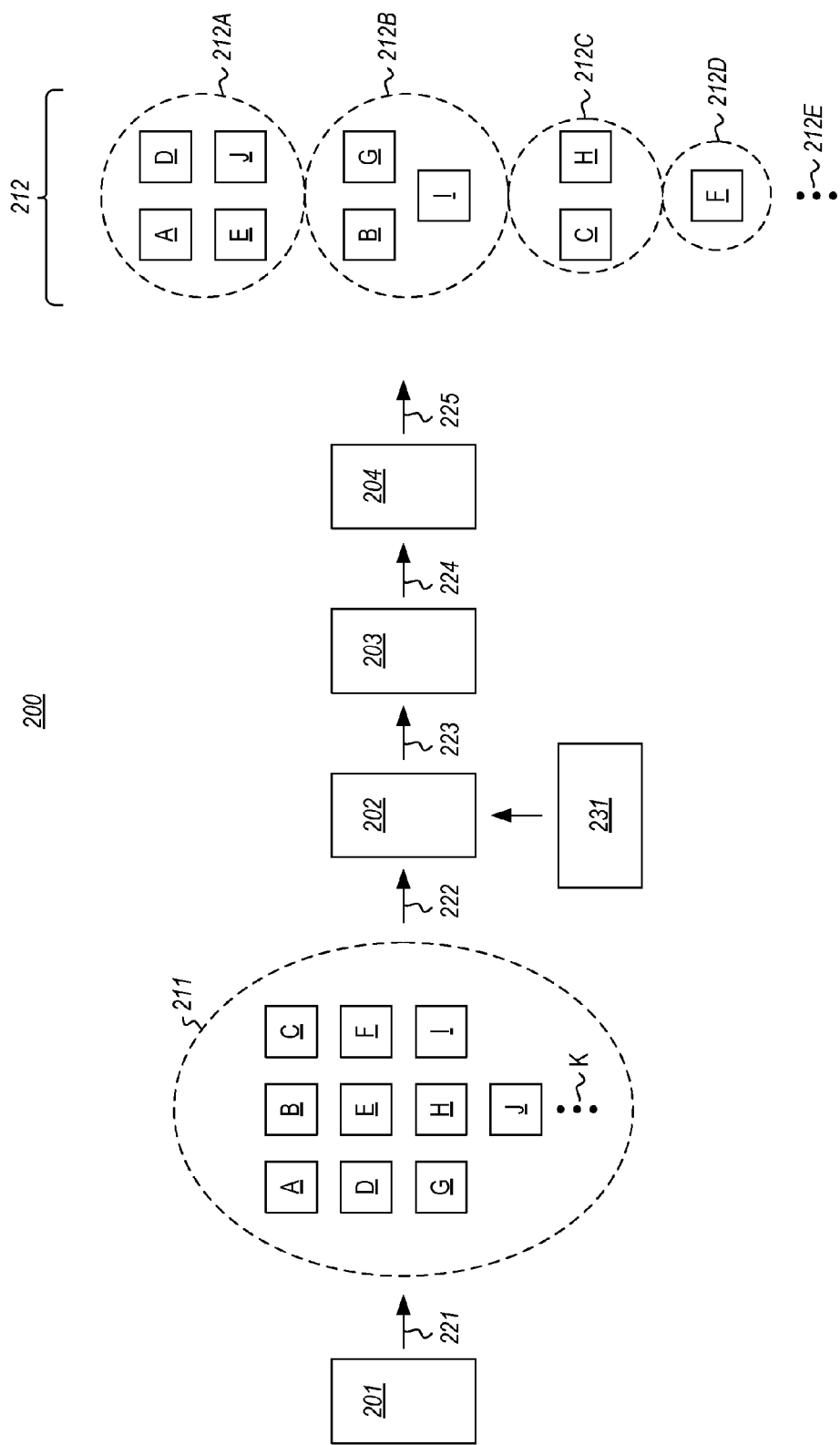
FIG. 2 illustrates a system that encodes each of multiple line pattern representations, and uses the encoding to categorize the line pattern representations in accordance with the principles described herein.
Figure 3:
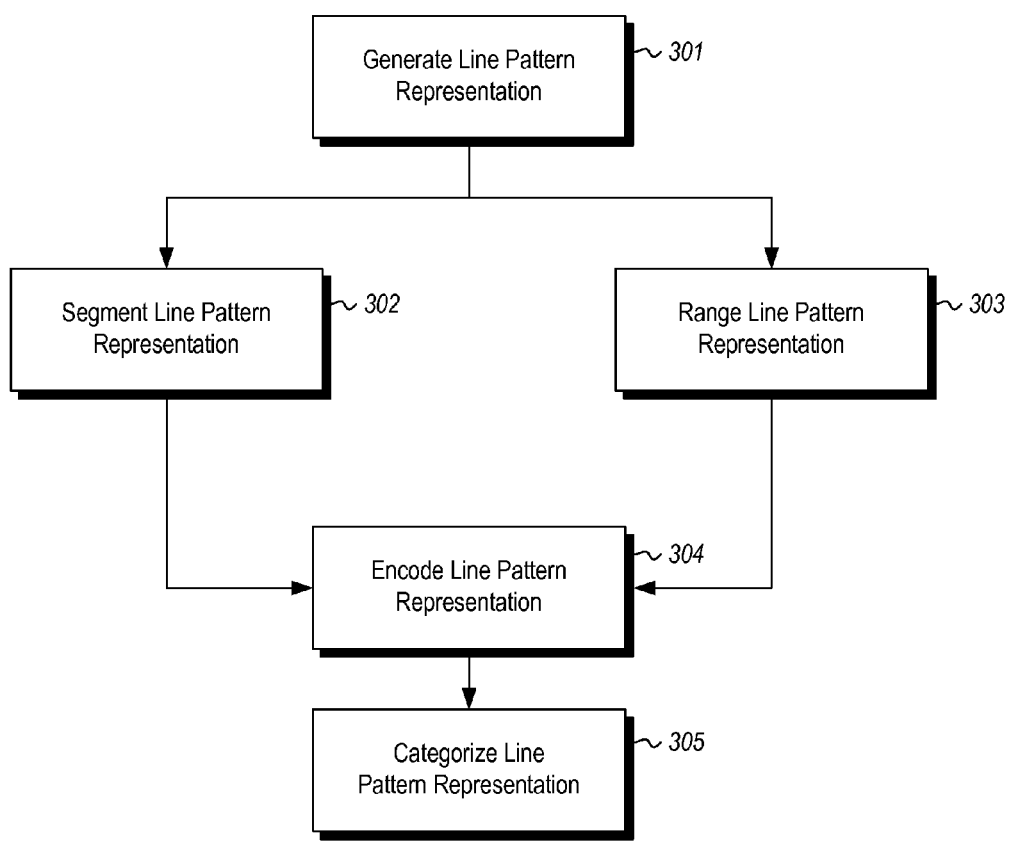
FIG. 3 illustrates a flowchart of a method for encoding line pattern representations and categorizing the line pattern representations based on the encoding in accordance with the principles described herein.

FIG. 2 illustrates a system 200 that encodes each of multiple line pattern representations, and uses the encoding to categorize the line pattern representations. FIG. 3 illustrates a flowchart of a method 300 for encoding line pattern representations and categorizing the line pattern representations based on the encoding. As the method 300 of FIG. 3 may be performed by the system 200 of FIG. 2, the description of FIGS.

2 and 3 will now proceed in an intermingled fashion. The method 300 may be performed for each of multiple line pattern representations.

The system 200 includes a pattern generation component 201, which generates one or more line pattern representations (act 301 in FIG. 3), each representing a line pattern having a changing value in the first dimension as a function of a value in a second dimension. The line pattern representation may be generated based on underlying data accessible (either locally or remotely) to the pattern generation component 201. Examples of line patterns include, for example, time series charts, log series data, usage charts, activity charts, and so forth. As very specific examples, such charts might allow a user to quickly evaluate any type of information such as example call patterns, data center operations, social media response (e.g., number of tweets) regarding a particular actor before and after an academy award event, and so forth.

In FIG. 2, the pattern generation component 201 generates (as represented by arrow 221) a set 211 of line pattern representations represented symbolically as A through J in FIG. 2. Although 10 line pattern representations A though J are illustrated in FIG. 2, the ellipses K symbolically represents that there is no limit to the number of line pattern representations generated by the pattern generation component 201 in a single group categorization of line pattern representations. There may be up to thousands or even millions or more of line pattern representations. As previously mentioned, one of the advantages of embodiments described herein is the ability to encode and quickly categorize large numbers of line pattern representations in a relatively short period of time to enable more real time categorization of large line pattern data sets.

Figure 4:
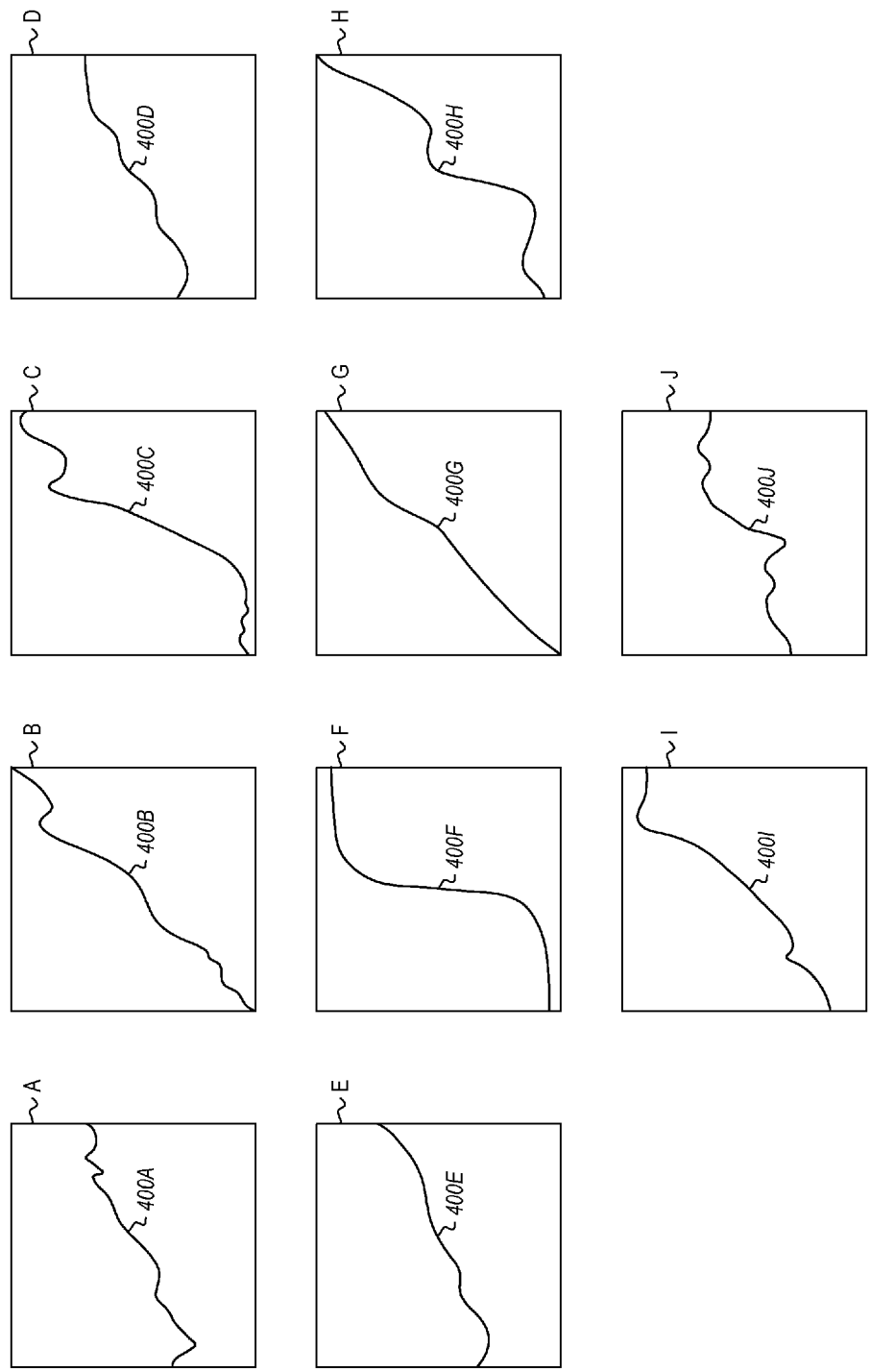
FIG. 4 illustrates a number of example line pattern representations used as a specific example of how the principles described herein may be employed.

FIG. 4 illustrates example line pattern representations A through J in further detail including corresponding represented line pattern 400A through 400J. These line pattern representations will be referred to as a single example, although the principles described herein are applicable to any set of line pattern representations regardless of the line patterns themselves, and regardless of the number of line pattern representations. Nevertheless, the example line pattern representations A though J of FIG. 4 will be a helpful and specific study that will illuminate the more general principles that are not limited to this example. In the case of FIG. 4, the first dimension (along which the line pattern value varies) is the vertical dimension often referred to as the "y axis", whereas the second dimension (representing the input value) is the horizontal axis often referred to as the "x axis".

Figure 5:
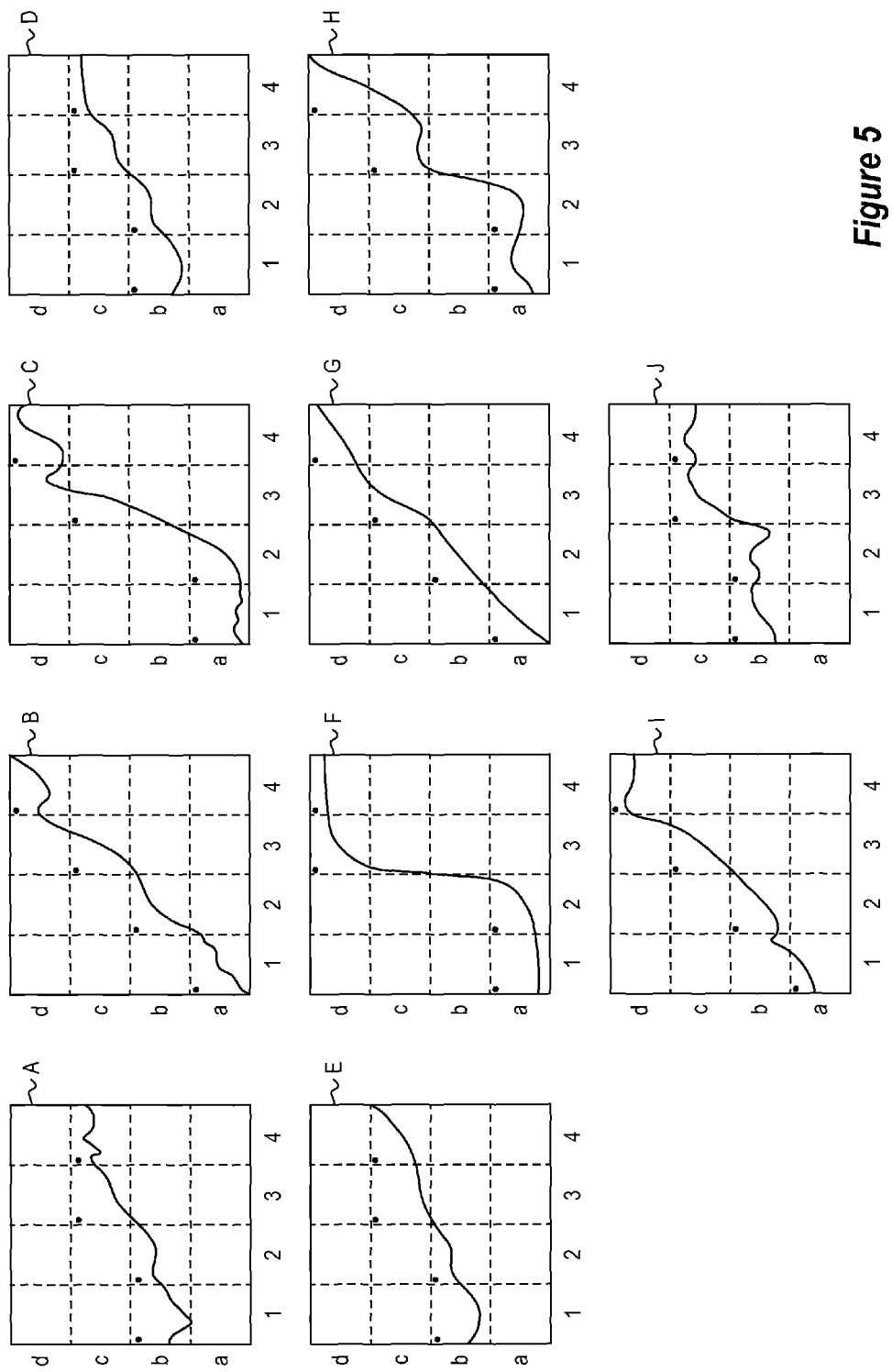
FIG. 5 illustrates the line pattern representations of FIG. 4 segmented into four segments and ranged into four ranges.

Referring again to FIG. 2, the segmentation component 202 accesses the line pattern representations (as represented by arrow 222) in FIG. 2, and segments each the line pattern representation into multiple segments along the second dimension (reference act 302 of FIG. 3). The segmentation component 202 also may divide the first dimension of each line pattern representation into multiple ranges (reference act 303 of FIG. 3). For instance, FIG. 5 illustrates the same line pattern representations A though J of FIG. 4, except that the line pattern representations are shown as segmented and ranged. In the case of FIG. 5, there are four segments 1 through 4 and four ranges "a" through "d", although other segmentation and range examples of the line pattern representations A through J will be described with respect to FIGS. 6 and 7.

The encoding component 203 access the segmented and ranged line pattern representation (as represented by arrow 223) in FIG. 2, and assigns a quantized value to each of the segments for each of the line pattern representations based on the changing value in the first dimension as present within the corresponding segment (reference act 304 of FIG. 3). For instance, in FIG. 5, the line pattern of line pattern representation A has a value that generally falls within range "b" within segment 1, within range "b" within segment 2, within range "c" within segment 3, and within range "c" for segment 4. Accordingly, the line pattern representation might be encoded with the sequence "bbcc", labeling the applicable ranges from left to right as the line pattern moves through the segments 1 through 4 in order.

The assignment of the range within which the line pattern falls for a given segment may be a relatively straightforward calculation in order to allow the categorization process to be efficient so that even large data sets may be quickly categorized. As an example, the mean of the line pattern within the corresponding segment may be calculated, and the identifier for the range within which that mean falls will be assigned for that segment. However, the principles described herein are not limited to how the range identifier for any given segment is identified.

As for the line pattern of line pattern representation B in FIG. 5, the mean of the line pattern falls within the range "a" within the segment 1, within the range "b" within the segment 2, within the range "c" within the segment 3, and within range "d" within the segment 4. Thus, the line pattern representation B is encoded with the sequence "abcd" (for reader reference, a dot is placed in the upper left corner of the applicable range for each segment of each line pattern representation A through J shown in FIGS. 5 through 7). This may continue for all line pattern representations A through J of FIG. 5 to encode the line patterns as shown in the following Table 1:

TABLE 1

| Line Pattern Representation Identifier | Encoded Representation |
| --- | --- |
| A | bbcc |
| B | abcd |
| C | aacd |
| D | bbcc |
| E | bbcc |
| F | aadd |
| G | abcd |
| H | aacd |
| I | abcd |
| J | bbcc |

A pattern categorization component 204 accesses the encoded representations (as represented by arrow 224), and categorizes each of the line pattern representations using the encoded representations. For instance, the line pattern representations may be assigned (as represented by arrow 225) a category 212 such that a category is assigned to each unique encoded representation. Thus, those of the line pattern representations that have the same encoded representation are assigned to the same category.

In this specific example, there are four resulting unique encoded values, and thus there are three categories 212A through 212D. Those line pattern representations that have encoding "bbcc" (line pattern representations, A, D, E and J) are assigned into category 212A. Those line pattern representations that have encoding "abcd" (line pattern representations B, G and I) are assigned into category 212B. Those line pattern representations that have encoding "aacd" (line pattern representations C and H) are assigned into category 212C. Those line pattern representations that have encoding "aadd" (only line pattern representation F) are assigned to category 212D. Just like there may be more line pattern representations not illustrated in FIG. 2 as represented by ellipses K, there may be more categories as represented by ellipses 212E, and there may be more line pattern representations in the illustrated categories 212A through 212D also.

While all of the line pattern representations generated by the pattern generation component 201 may be converted into an encoding and thereby assigned to a category, that need not be the case. For whatever reason, perhaps not all line pattern representations that are generated (as represented by arrow 221) might segmented. Furthermore, perhaps not all line pattern representations that are segmented are encoded. Finally, perhaps not all line pattern representations that are encoded are assigned to a category.

Figure 6:
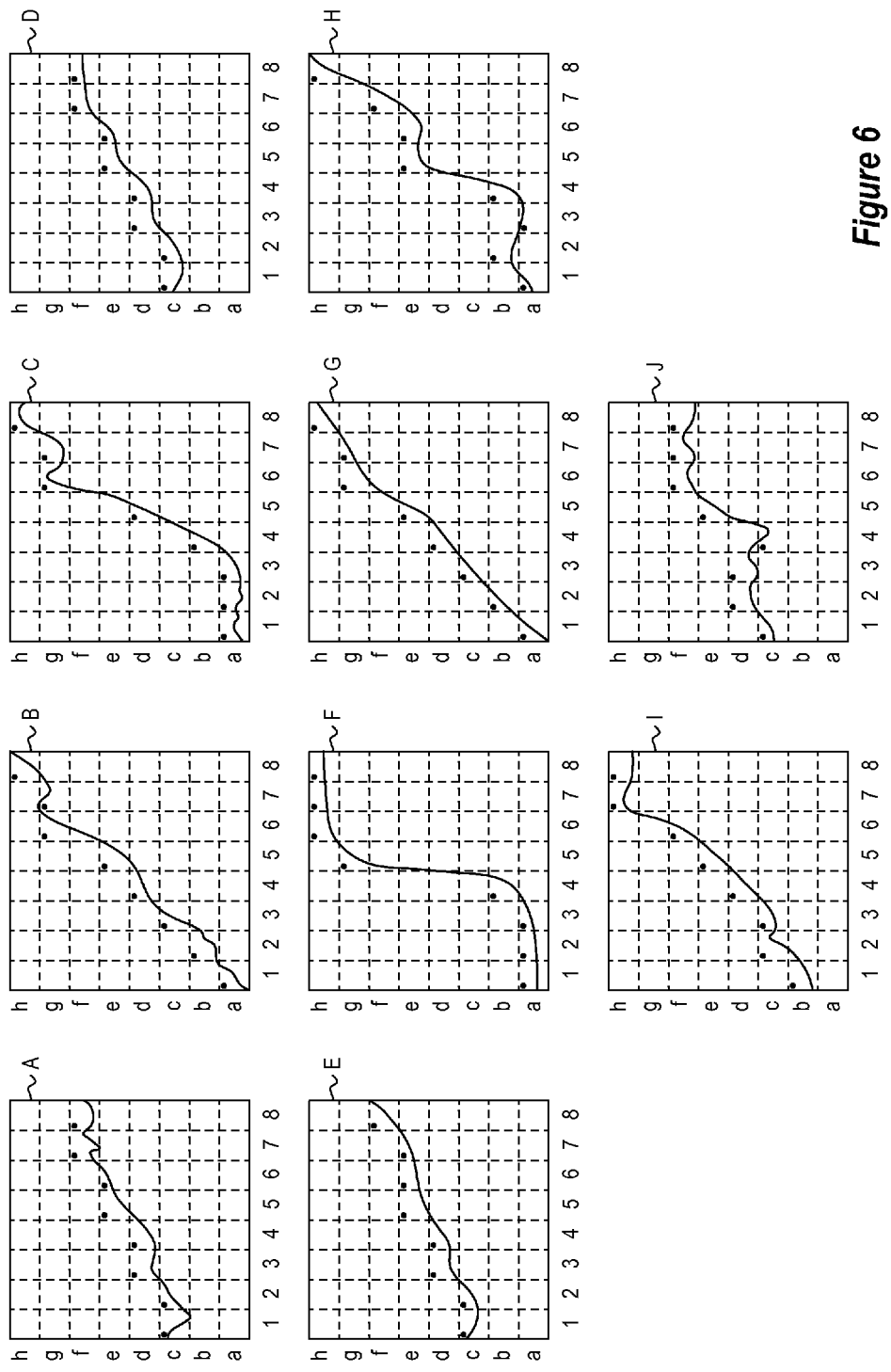
FIG. 6 illustrates the line pattern representations of FIG. 4 segmented into eight segments and ranged into eight ranges.

In any case, the segmentation component 202 may make different determinations as to how to segment and range the various line pattern representations. For instance, FIG. 6 illustrates that the segmentation component segments the line pattern representations into eight different segments and ranges the line pattern representation into ranges labeled "a" through "h". The encoding result would be an eight member sequence where each member may be anywhere from "a" to "h" inclusive, depending on the value of the line pattern within the corresponding segment. Accordingly, the encoding component 203 would assign the encoding values illustrated in the following Table 2.

TABLE 2

| Line Pattern Representation Identifier | Encoded Representation |
| --- | --- |
| A | ccddeeff |
| B | abcdeggh |
| C | aaabdggh |
| D | ccddeeff |
| E | ccddeeef |
| F | aaabghhh |
| G | abcdeggh |
| H | ababeefh |
| I | bccdefhh |
| J | cddcefff |

In this case, there are a larger number of unique encodings. For instance, there are eight unique encodings resulting in 10 line pattern representations. Thus, there are 8 categories with only two categories having multiple line pattern representations. For instance, encoding ccddeeff corresponds to a category that includes two line pattern representations A and D. Encoding abcdeggh corresponds to a category that includes two line pattern representations B and G. Thus, as the segmentation and ranging granularity increased, line pattern representations that are within a single category are more closely matched, but there tend to be fewer numbers of line pattern representations per category.

Figure 7:
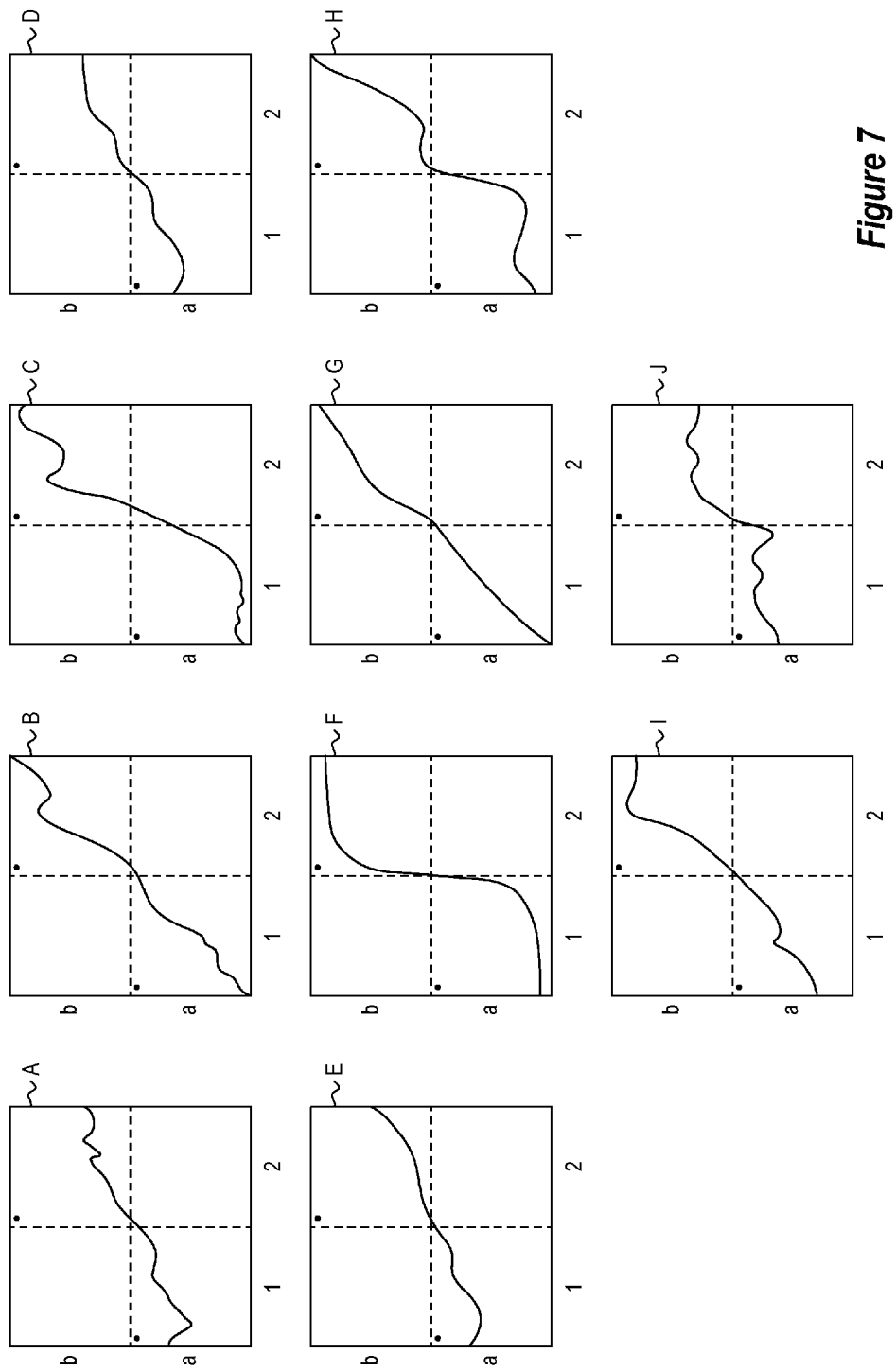
FIG. 7 illustrates the line pattern representations of FIG. 4 segmented into two segments and ranged into two ranges.

As another example that moves in the opposite level of granularity, FIG. 7 illustrates that the segmentation component segments the line pattern representations into only two segments and ranges the line pattern representation into two ranges labeled "a" through "b". The encoding result would be a two member sequence where each member has only one of two possible values "a" and "b", depending on the value of the line pattern within the corresponding segment. Accordingly, the encoding component 203 would assign the encoding values illustrated in the following Table 3.

TABLE 3

| Line Pattern Representation Identifier | Encoded Representation |
| --- | --- |
| A | ab |
| B | ab |
| C | ab |
| D | ab |
| E | ab |
| F | ab |
| G | ab |
| H | ab |
| I | ab |
| J | ab |

In this case, there is one unique encoding, and thus one category, in which all ten line pattern representations belong. For most people and applications, for the data set example of FIG. 4, the segmentation granularity of Table 1 might likely be the most helpful. However, the optimal level of granularity is fact dependent, and may depend on subjective factors such as user preferences. There may be an optimal sweet spot of granularity that most effectively communicates data to a given user given the surrounding circumstances.

The effective level of granularity may be found at least in part in an automated fashion using a segmentation adjustment component 231. In one example, before or after visualizing the line pattern categories 212 on a display (such as display 112), the segmentation adjustment component 231 might analyze the number of categories that resulted from a given level of segmentation in one dimension and ranging in the other dimension. If the segmentation adjustment component 231 decides that the number of categories is just too high, then the segmentation adjustment component 231 decreases the number of segments and/or ranges. If the segmentation adjustment component 231 decides that the number of categories is just too low, then the segmentation adjustment component 231 increases the number of segments or ranges. This may iterate a number of times until the segmentation adjustment component 231 estimates an ideal level of segmentation.

The segmentation adjustment component 231 may operate entirely in response to user input such that the user drives all re-segmentation and ranging in real time, and/or in response to registered user preferences. Alternatively, the segmentation adjustment component 231 may operate entirely in an automated fashion. The segmentation adjustment component 231 may also consider previous user adjustment made when presenting categories of line pattern representations to the user. Any other contextual factors might also be considered such as time of day, age of user, size of the line representation data set.

In one embodiment, user themself may have provided one of the line pattern representations. As categories are formed, those line patterns that match the same category as the line pattern representation provided by the user may be considered to be the line patterns that most closely align with the users inputted line pattern representation. Thus, searches of line pattern representations based on user input may also be efficiently performed.

Autocomplete of line pattern representations may also be performed by repeatedly performing a search operation (by categorizing the input line pattern representation made to that point, and by also categorizing the data set line pattern representations also to the same point), and finding those line patterns that to that point. As the user draws an input line pattern, the number of matching line pattern representations would decrease. Once the user found an acceptable or search form line pattern representation within the data set, the user might simply select that visualization of the line pattern representation.

Accordingly, an efficient mechanism for encoding and categorizing line pattern representations has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a pattern generation component configured to provide a line pattern representation representing a line pattern having a changing value in a first dimension as a function of a value in a second dimension;
   a segmentation component configured to segment the line pattern representation into a plurality of segments along the second dimension;
   an encoding component configured to encode the line pattern representation into an encoded representation by assigning a quantized value to each of the plurality of segments based on the changing value in the first dimension as present within the corresponding segment;
   a pattern categorization component configured to categorize each line pattern representation into a category of a plurality of categories using the encoded representation; and
   a segmentation adjustment component configured to adjust at least a number of the plurality of segments that the segmentation component segments, wherein the segmentation adjustment component is configured to at least adjust at least the number of the plurality of segments as a function of a number of the plurality of categories.

2. The system in accordance with claim 1, wherein
   the pattern generation component is configured to provide a first plurality of line pattern representations, each representing a line pattern having a changing value in a first dimension as a function of a value in a second dimension,
   the segmentation component is configured to segment the line pattern representation for each of a second plurality of line pattern representations of the first plurality of line pattern representations into a plurality of segments along the second dimension, and
   the encoding component is configured to encode a line pattern representation for each of a third plurality of line pattern representations of the plurality of segments into the encoded representation by assigning a quantized value to each of the plurality of segments based on the changing value in the first dimension as present within the corresponding segment.

3. The system in accordance with claim 2,
   wherein the pattern categorization component is configured to categorize each of at least a fourth plurality of line pattern representations of the third plurality of line pattern representations into the plurality of categories using the encoded representation of each of the fourth plurality of line pattern representations.

4. The system in accordance with claim 3, wherein the pattern categorization component assigns the category to each unique encoded representation such that those of the third plurality of line pattern representations that have the same encoded representation are in the same category.

5. The system in accordance with claim 2,
   wherein the segmentation adjustment component adjusts at least the number of the plurality of segments that the segmentation component segments the second plurality of line pattern representations into.

6. The system in accordance with claim 5, wherein the adjustment is performed in response, at least in part, to user input.

7. The system in accordance with claim 5, wherein the adjustment is performed automatically by the segmentation adjustment component.

8. The system in accordance with claim 7, wherein the segmentation adjustment component adjusts at least the number of the plurality of segments, at least in part, as the function of the number of the plurality of categories.

9. The system in accordance with claim 5, wherein the segmentation adjustment component further adjusts a level of quantization of the quantized values that the encoding component assigns to each of the plurality of segments.

10. A computer program product comprising one or more computer-readable storage media devices having stored thereon computer-executable instructions that when executed by one or more processors of a computing system, cause the computing system to perform a method comprising:
    an act of providing a line pattern representation representing a line pattern having a changing value in a first dimension as a function of a value in a second dimension;
    an act of segmenting the line pattern representation into a plurality of segments along the second dimension;
    an act of encoding the line pattern representation into an encoded representation by assigning a quantized value to each of the plurality of segments based on the changing value in the first dimension as present within the corresponding segment;
    an act of categorizing each line pattern representation into a category of a plurality of categories using the encoded representation; and
    adjusting at least a number of the plurality of segments that the act of segmenting segments as a function of a number of the plurality of categories.

11. The computer program product in accordance with claim 10, the method further comprising:
    an act of determining a number of the plurality of segments to segment the line pattern representation into in the act of segmenting.

12. The computer program product in accordance with claim 11, wherein the act of determining is performed in response to user input.

13. The computer program product in accordance with claim 10, wherein
    the act of providing is included as part of an act of providing a first plurality of line pattern representations, each representing a line pattern having a changing value in a first dimension as a function of a value in a second dimension,
    the act of segmenting is included as part of an act of segmenting the line pattern representation for each of a second plurality of line pattern representations of the first plurality of line pattern representations into a plurality of segments along the second dimension, and
    the act of encoding is included as part of an act of encoding a line pattern representation for each of a third plurality of line pattern representations of the plurality of segments into an encoded representation by assigning a quantized value to each of the plurality of segments based on the changing value in the first dimension as present within the corresponding segment.

14. The computer program product in accordance with claim 13, the method further comprising:
an act of categorizing each of at least a fourth plurality of line pattern representations of the third plurality of line pattern representations into the plurality of categories using the encoded representation of each of the fourth plurality of line pattern representations.

15. The computer program product in accordance with claim 10, wherein the first dimension is a vertical display dimension, and the second dimension is a horizontal display dimension.

16. The computer program product in accordance with claim 10, wherein the line pattern representation is a portion of a larger line pattern representation.

17. The computer program product in accordance with claim 10, wherein the line pattern representation is input by a user.

18. The computer program product in accordance with claim 10, wherein the line pattern representation is a time series representation.

19. The computer program product in accordance with claim 10, wherein the line pattern representation is a log series representation.

20. A method for categorizing a plurality of line pattern representations into a plurality of categories, the method comprising:
an act of providing a first plurality of line pattern representations, each representing a line pattern having a changing value in a first dimension as a function of a value in a second dimension;
an act of segmenting the line pattern representation for each of a second plurality of line pattern representations of the first plurality of line pattern representations into a plurality of segments along the second dimension; and
an act of encoding a line pattern representation for each of a third plurality of line pattern representations of the plurality of segments into an encoded representation by assigning a quantized value to each of the plurality of segments based on the changing value in the first dimension as present within the corresponding segment; and
an act of categorizing each of at least a fourth plurality of line pattern representations of the third plurality of line pattern representations into a plurality of categories using the encoded representation of each of the fourth plurality of line pattern representations; and
an act of adjusting at least a number of the plurality of segments as a function of a number of the plurality of categories.

\* \* \* \* \*